United States Patent
Yadav et al.

(10) Patent No.: US 12,216,549 B2
(45) Date of Patent: Feb. 4, 2025

(54) CLOUD-BASED PROCESSING OF BACKUP DATA FOR STORAGE ONTO VARIOUS TYPES OF OBJECT STORAGE SYSTEMS

(71) Applicant: EMC IP Holding Company LLC, Hopkinton, MA (US)

(72) Inventors: Sunil Yadav, Bangalore (IN); Shelesh Chopra, Bangalore (IN); Amarendra Behera, Bangalore (IN); Himanshu Arora, Bangalore (IN); Tushar Dethe, Bangalore (IN); Ravi Vijayakumar Chitloor, Bengaluru (IN); Prabhatkumar Dubey, Huskuru (IN); Deependra Singh, Kanpur (IN); Jigar Bhanushali, Kanpur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 17/078,853

(22) Filed: Oct. 23, 2020

(65) Prior Publication Data

US 2022/0129352 A1    Apr. 28, 2022

(51) Int. Cl.
| | | |
|---|---|---|
| *G06F 11/14* | (2006.01) | |
| *G06F 16/174* | (2019.01) | |
| *G06F 16/18* | (2019.01) | |
| *G06F 16/182* | (2019.01) | |

(Continued)

(52) U.S. Cl.
CPC ...... *G06F 11/1464* (2013.01); *G06F 11/1451* (2013.01); *G06F 11/1461* (2013.01); *G06F 11/1469* (2013.01); *G06F 16/1748* (2019.01); *G06F 16/1824* (2019.01); *G06F 16/1858* (2019.01); *H04L 67/06* (2013.01); *H04L 67/56* (2022.05)

(58) Field of Classification Search
CPC ............. G06F 16/1858; G06F 11/1469; G06F 16/1824; G06F 11/1451; G06F 11/1464; G06F 11/1461; G06F 16/1748; H04L 67/06; H04L 67/56
USPC .................................................. 711/162, 161
See application file for complete search history.

(56) References Cited

U.S. PATENT DOCUMENTS

| 2014/0046909 A1* | 2/2014 | Patiejunas ......... G06F 16/24554 707/687 |
| 2018/0137139 A1* | 5/2018 | Bangalore ........... G06F 16/2379 |
| 2021/0218636 A1* | 7/2021 | Parvathamvenkatas ..................... H04L 67/306 |

* cited by examiner

*Primary Examiner* — Hosain T Alam
*Assistant Examiner* — Zubair Ahmed
(74) *Attorney, Agent, or Firm* — Dergosits & Noah LLP; Todd A. Noah

(57) ABSTRACT

Described is a system for cloud-based processing of backup data for storage onto various types of object storage systems. A specialized cloud-based component (e.g. proxy server) may act as an intermediary when backing up data from a client system to an object storage. For example, the cloud-based component may be provided as part of backup service that operates in conjunction with a client system. Accordingly, the system may allow different clients of a backup service to efficiently and seamlessly interact with the different third-party object storage providers via a single cloud-based component. To provide such object-storage-agnostic functionality, the cloud-based component may include a function library that includes object-storage-specific functions. For example, the cloud-based component may invoke a specific set of operations that interact with a storage API provided by a particular object storage provider.

20 Claims, 4 Drawing Sheets

(51) Int. Cl.
*H04L 67/06* (2022.01)
*H04L 67/56* (2022.01)

CLOUD-BASED PROCESSING OF BACKUP DATA FOR STORAGE ONTO VARIOUS TYPES OF OBJECT STORAGE SYSTEMS

TECHNICAL FIELD

This disclosure relates to managing data backup systems, and more particularly, providing cloud-based processing of backup data for multiple types of object storage systems.

BACKGROUND

Data storage systems (or on-demand storage services) may provide various tools that are crucial for enterprise level network clients. For example, clients may rely on such systems for data protection and recovery services that efficiently back up and recover data in the event of data loss to allow business applications to remain in service or quickly come back up to service. As part of an overall data protection plan, clients may subscribe to a third-party cloud-based storage service (e.g. storage-as-a-service) to leverage the benefits associated with such on-demand systems such as cost efficiency and scalability. Accordingly, clients may store data within both a local (or on-premises) environment as well as a cloud-based storage. Clients are often required to maintain strict security protocols to secure locally stored data, and as a result, are often burdened with developing elaborate configurations to safe guard the local data that may be exposed to the third-party cloud-based storage. Moreover, these cloud-based storages may be provided by different companies (or entities, providers, etc.) that each implement different storage infrastructures. Accordingly, integrating such systems with the client's backup infrastructure becomes increasingly difficult. Thus, there is a continued need to integrate client systems with cloud-based storage services.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
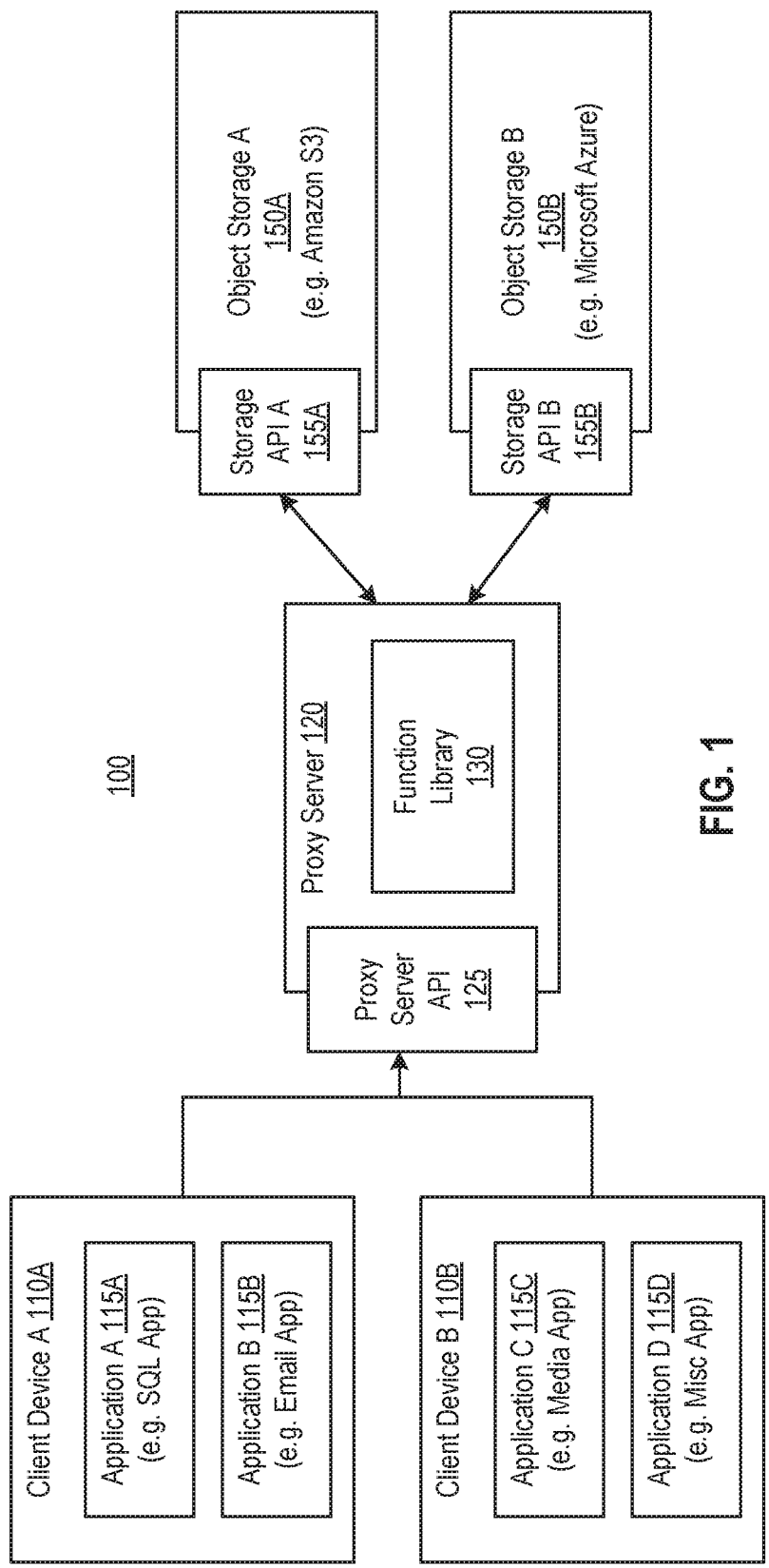
FIG. 1 is a block diagram illustrating an example operating environment for providing cloud-based processing of backup data for various types of object storages according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for cloud-based processing of backup data for storage onto various types of object storages. In some embodiments, the system may include a specialized cloud-based component (e.g. proxy server) which may act as an intermediary when backing up data from a client system to an object storage. For example, the cloud-based component may be provided as part of backup service that operates in conjunction with a client system and acts as a universal (or centralized) component for processing data for storage onto an object storage. Accordingly, the system may allow different clients of a backup service to securely and seamlessly interact with different third-party object storage providers (e.g. Amazon S3, Microsoft Azure, etc.) via a single cloud-based component. To provide such universal functionality, the cloud-based component may provide a specialized interface. For example, the interface may include a REST (Representational State Transfer) API that includes a common set of operations to perform data-related operations on various object storages. For example, the same set of operations may be used for different object storage providers. To provide such object-storage-agnostic functionality, the cloud-based component may include a function library that includes object-storage-specific functions. For example, the cloud-based component may invoke a specific set of operations that interact with the particular storage API of an object storage provider.

The cloud-based component may also provide enhanced security of backup data management by being a single secure point of access to externally stored object data. For example, a client system may implement certain network configurations (e.g. firewalls) that limit external access to the client environment. Such a network configuration may be customized to allow external access to only the cloud-based component thereby continuing to protect the client system from unauthorized access. Accordingly, the client system may continue accessing the locally stored data in the same manner, but route external data accesses through the secure cloud-based component.

The cloud-based component may also allow the client system to offload resource intensive backup processing. Moreover, the client system may offload such processing by merely using the REST API. For example, the client system may initiate a data backup by providing a limited amount of information such as data identifying information as part of a request to put data onto an object storage. The cloud-based component may then handle the rest of the backup processing such as chunking, deduplication, efficient data transfer, and validation when storing the data on a destination object storage. Accordingly, the cloud-based component provides advantages over traditional proxy servers that merely forward data in that the cloud-based component may perform actual backup processing.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for providing cloud-based processing of backup data for various types of object storages according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include one or more client devices 110 (e.g. client devices A 110A and B 110B), a proxy server (e.g. cloud-based component) 120, and one or more cloud-based (or on-demand) object storages 150 (e.g. object storages A 150A and B 150B). In general, the proxy server 120 may act as an intermediary between the client device 110 and an object storage (or object storage system) 150. In some embodiments, the client device 110 may be associated with a client that is customer (or subscriber, client, tenant, user, account, etc.) of a backup service or platform (e.g. software/platform-as-a-service) provided by a first entity, as well as a customer of an object storage (or platform) provided by a different (or second) entity. For example, the proxy server 120 may be provided as part of the backup service provided the first entity (e.g. Dell EMC), and the object storage 150 may be provided as part of an object storage service provided by the different entity (e.g. services such as Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device 110 may be associated with data (e.g. one or more files, directories, objects, etc.) that is to be backed up to a particular object storage 150. For example, the data to be backed up may originate from one or more applications 115 (e.g. applications A-D 115A-D) associated with a client device 110. Each of these applications 115 may create different types of data that may backed up to an object storage 150 using a backup processing as further described herein.

The object storage (or object storage system) 150 may include a persistent object storage that implements a storage architecture that manages data as objects. For example, each object stored by an object storage 150 may include data, meta-data, and/or a globally unique identifier for the object.

The proxy server 120 may be an application or hardware component remote from the client device 110. As described, the proxy server 120 may act as an intermediary between the client device 110 and an object storage 150. The proxy server 120 may be provided as part of a cloud-based backup service platform, and accordingly, the proxy server 120 may be scalable such that it may perform data processing operations in parallel for multiple client devices 110 and for multiple object storages 150.

In operation, the client device 110 may use the proxy server 120 for managing backup data stored on the object storage 150. To provide such functionality, the proxy server 125 may provide a proxy server API 125. In some embodiments, the proxy server API 125 may be a REST API that includes a common set of operations to perform data-related operations on various object storages 150. For example, the proxy server API 125 may include operations allowing a client device 100 to read data from an object storage 150, write data to an object storage 150, delete data from an object storage 150, etc. in a client/customer agnostic manner. The same set of operations provided by the proxy server API 125 may be used by the client device 110 irrespective of whether the operations are for data stored on object storage A 150A, or object storage B 150B. To provide such object-storage-agnostic functionality, the proxy server 120 may include a function library 130 that includes object-storage-specific functions. For example, the proxy server 120 may interact directly with the object storage 150 to perform such data-related operations. In some embodiments, the proxy server 120 may interact with (or access) the object storage system 150 using a storage API 155. The storage API may be specific to each object storage system 150. For example, storage API A 155A may have certain operations specific to object storage A 150A (e.g. Amazon S3), and storage API B 155B may have certain operations specific to object storage B 150B (e.g. Microsoft Azure). To perform backup processing specific to a particular object storage 150A/B, or to interact with the specific object storage API 155A/B, the proxy server 120 may retrieve a particular (e.g. object-storage-specific) set of functions from the function library 130. In other words, the function library 130 may include a specific set of functions that are configured to interact with a particular object storage 150. For example, to interact with object storage A 150A, the proxy server 120 may use (e.g. execute, invoke, call, etc.) a first set of functions specific to object storage A 150A/API 155A, and to interact with object storage B 150B, the proxy server 120 may use a second set of functions specific to object storage B 150B/API 155B.

Accordingly, despite the potentially different types of client devices 110 and object storages 150, all of the source data may be managed through the same proxy server 120. By way of example, application A 115A may be a first type of application (e.g. SQL application) that creates a first type of data (or file, object, etc.), and application B 215B may be a second type of application (e.g. email application) that creates a second type of data, both of which may be backed up to the same or different type of object storage 150 using the same set of calls from the proxy server API 125. As another example, client devices 110 associated with different customers of an object storage 150 (or object storage service) may use the same proxy server API 125. For example, client device A 150A, which may be associated with customer A, may back up data to object storage A 150A (e.g. as part of an Amazon S3 account associated with customer A) using a set of calls provided by the proxy server API 125, and client device B 150B, which may be associated with customer B, may back up data to object storage B 150B (e.g. as part of a Microsoft Azure account associated with customer B) via the same set of calls.

Accordingly, the configuration of the proxy server 120 may allow customers (or clients) of a backup service to efficiently and seamlessly interact with the different cloud-based services providers (or entities) when managing backup data.

Figure 2:
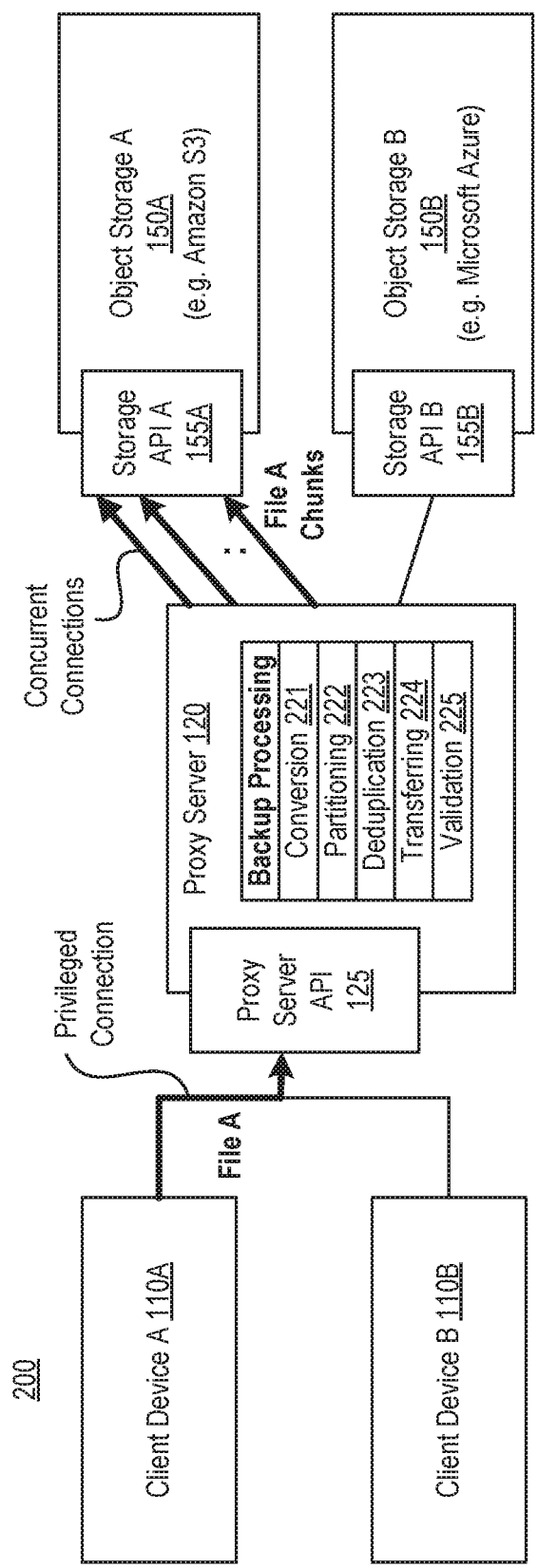
FIG. 2 is a process flow diagram illustrating an example process flow for backing up data from a client device to various types of object storages using a cloud-based component according to one or more embodiments of the disclosure.

FIG. 2 is a process flow diagram illustrating an example process for backing up data from a client device to various types of object storages using a cloud-based component according to one or more embodiments of the disclosure.

As shown, the process may include storing a file (e.g. shown as File A) from a client device (e.g. client device A 110A) to an object storage (e.g. object storage A 150A) via the proxy server 120. To initiate a process to back up the file, the proxy server 120 may receive a request (e.g. instruction, indication, command, etc.) to store data to an object storage 150. The request may be provided by a user (e.g. backup administrator), or by an application (e.g. backup application) associated with a client device 110 (e.g. as part of an automated procedure). In this example, client device A 110A may submit a request to store the File A on object storage A 150A. Client device A 110A may submit the request using the proxy server API 125, which may be a REST API. For example, the request may include using a "PUT" method (or operation, function, etc.) to store File A on object storage A 150A. The request may include an identifier such as filename, ID, hash value, or other information for the data to be stored on the object storage 150. For example, the request may include a filename for File A. In some embodiments, only identifying information of File A may be required from the client device 110 (e.g. as part of the request) for the proxy server 120 to initiate the backup process. Based on the particular client device (e.g. client device A 110A) acting as the source of the data, the proxy server 120 may determine the appropriate destination object storage (e.g. object storage A 150A). For example, the proxy server 120 may have information stored (e.g. as part of a database) to associate client device A 110A with a storage account associated with object storage A 150A. However, in some embodiments, the request may also include information indicating a storage destination of the data. For example, the storage destination may include one or more of an object storage identifier (e.g. identifier for object storage A 150A), destination information (e.g. container ID, bucket ID, etc.), storage (or customer) account information, type of storage (e.g. storage tier), and other information or metadata used for storing data (e.g. retention information, priority information, etc.).

In some embodiments, communication (e.g. requests, data transfer, etc.) between the client device 110 and proxy server 120 may be performed in secure manner. For example, as shown, access from a client device 110 to the proxy server 120 may be via privileged connection. In some embodiments, a network configuration (or settings) may prevent access to the client device 110 directly from the object storage 150. For example, the client device 110 may be behind a firewall. To allow access to the proxy server 120, however, the network configuration may include reserving one or more network ports (or addresses, connections, etc.) as privileged to allow the client device 100 to access the proxy server 120 as an intermediary.

Once the proxy server 120 receives data from the client device 110, the proxy server 120 may perform a backup processing. In some embodiments, the backup processing may include one or more processes (or sub-processes, operations, etc.). For example, as shown, these processes may include data conversion 221, partitioning (or chunking) 222, deduplication 223, transfer, 224, and validation 225. One or more of these processes may be performed using (or in conjunction with) a particular set of functions obtained from a function library (e.g. function library 130) associated with the proxy server 120. In some embodiments, the type of processing may be based on the particular destination object storage. For example, once the proxy server 120 receives File A from client device A 110A, the proxy server 120 may determine the appropriate set of functions associated with object storage A 150A to the backup processing.

Conversion 221 may include converting the data obtained from the client device 110 into a common format. This allows the proxy server 120 to perform uniform (or universal) data processing irrespective of the source or type of data. As described, the data may originate from different types of client applications (e.g. applications 115A-115D), and therefore, may be of a variable format. For example, File A may originate from an email application, and the proxy server 120 may convert File A into a common data format.

Partitioning 222 may include partitioning (or dividing) the data into chunks (or portions, segments, etc.) allowing data to be stored efficiently for backup and restoration operations. For example, different types of client applications may store information in various sizes. In some embodiments, partitioning 222 may include chunking the data into a predetermined size that is specialized (e.g. optimized, or near-optimized) for the destination object storage 150. For example, the partitioning 222 may divide (or segment) an object into an efficient size (e.g. ~4 mb) for storage. In some embodiments, these chunks may be associated (or linked) with each other using a database such as an SQL (or SQL lite) table. In some embodiments, the partitioning 222 may occur at the file level. For example, the email application that created File A may store data in 1 GB files on client device A 110A. Accordingly, the proxy server 120 may partition File A into chunks for improved efficiency. For example, the proxy server 120 may partition File A, which may be 1 GB in size, into 10 approximately equal chunks for processing.

Deduplication 223 may include a process to eliminate (or remove, discard, etc.) redundant data (e.g. data that is already stored on the object storage 150). In some embodiments, the data structures (e.g. indexes of data already stored on the object storage 150) may be managed by the proxy server 120. Accordingly, in some embodiments, after providing the request to store data, the client device 110 does not need to provide any additional information for the proxy server 120 to perform deduplication. In other words, the proxy server 120 requires only the information within the request to perform certain backup processing such as deduplication 223. For example, after client device A 110A indicates via the request the File A is to be stored on object storage A 150A, the proxy server 120 may handle the backup processing without requiring any substantive information (e.g. data hash values, index information, etc.) from client device A 110A. Instead, the proxy server 120 may handle such processing solely, or in conjunction with object storage A 150A.

Data transferring 224 may include performing an efficient transfer of data from the client device 110 and/or the proxy server 120 to the object storage 150. In some embodiments, as shown, the proxy server 120 may create a set of concurrent connections (or channels, pathways, etc.) with the object storage 150. The proxy server 120 may then transfer (or send, transmit, upload, etc.) the chunks in parallel to the object storage 150 via the concurrent access connections. For example, upon obtaining File A of 1 GB from client device A 110A, the proxy server 120 may partition File A into 10 chunks and place the chunks into a buffer. The proxy server 120 may also create a set of concurrent access connections with object storage A 150A. For example, if 10 concurrent access connections are created, the proxy server 120 may transmit the 10 File A chunks in parallel, and thereby reduce the transmission time to $\frac{1}{10}^{th}$ of the time typically required to transmit the 1 GB of data as a single file. In some embodiments, a specific set of functions may interact with a particular storage API (e.g. storage API A 155A) to create the access connections with object storage A 150A. Once all of the data is received, the object storage A 150A may store the chunks of data as part of one or more objects.

Data validation 225 may include verifying the chunks have been successfully transferred to the object storage 150. For example, the validation 225 may ensure that data has not been corrupted during the transmission process. This validation 225 may be performed by accessing a particular operation provided by the object storage 150 via a storage API. For example, the proxy server 120 may use the data validation operation to perform a comparison of hash values or checksums between the chunks originally transferred by the proxy server 120 for File A and the File A chunks ultimately stored by object storage A 150A.

As described, in some embodiments, the proxy server 120 may only require limited information (e.g. identification of data/file and destination object storage), and the proxy server 120 performs all of the backup processing including obtaining the data from the client device 110, conversion 221, partitioning 222, deduplication 223, transferring 224, and validation 225. For example, the client device 110 need only provide identifying information of the data and destination information as part of a put request provided via the proxy server API 125 to initiate backup processing by the proxy server 120.

Figure 3:
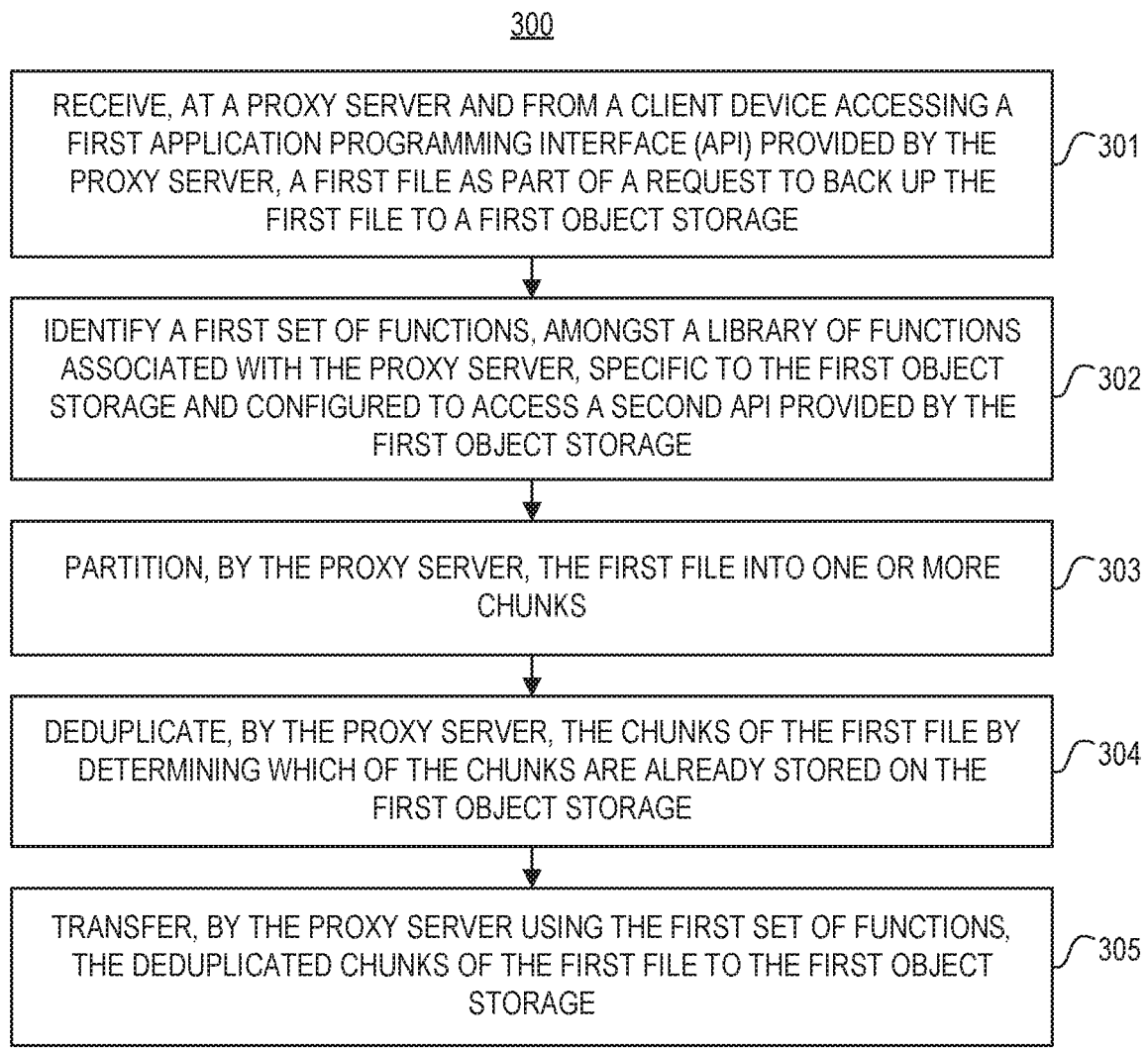
FIG. 3 is a flow diagram illustrating an example method of processing backup data for storage onto an object storage according to one or more embodiments of the disclosure.

FIG. 3 is a flow diagram illustrating an example method of processing backup data for storage onto an object storage according to one or more embodiments of the disclosure. Process 300 may use processing logic, which may include software, hardware, or a combination thereof. For example, process 300 may be performed by a system including one or more components described in operating environment 100. In some embodiments, the system may include a cloud-based component (e.g. proxy server 120) that that performs process 300.

In 301, the system (e.g. proxy server 120) may receive a first file as part of a request to back up the first file to a first object storage (e.g. object storage A 150A). In some embodiments, the first file may be received from a client device (e.g. client device A 110A) accessing a first API (e.g. proxy server API 125) provided by the proxy server. For example, accessing the API may include providing a request to put (e.g. store) the first file onto the first object storage (e.g. destination object storage). The request may include one or more of an identifier for the first file (e.g. filename, ID, hash value, etc.), an identifier for the first object storage (e.g. identifier for object storage A 150A), and a storage destination (or location) to store the first file (e.g. container, bucket, resource, etc.) on the first object storage.

In some embodiments, a network configuration associated with the client device prevents access to the client device directly from the first object storage. However, access to the proxy server may be authorized. For example, the request to back up the first file from the client device may be provided using a privileged connection specified by the network configuration. For example, the client device may be protected via a secure firewall. Accordingly, access to the proxy server from the client device may be allowed using an authorized (or predefined) port as the privileged connection that is specified as the part of the firewall settings.

In 302, the system may identify a first set of functions specific to the first object storage and configured to access a second API (e.g. object storage API 155A) provided by the first object storage. In some embodiments, the first set of functions may be identified amongst a library of functions (e.g. function library 130) associated with (e.g. stored by, or accessible by) the proxy server. For example, the proxy server may determine which set of functions to use (e.g. execute, invoke, call, etc.) based on a destination object storage identifier (e.g. resource, endpoint, etc.) included within the request. However, in some embodiments, the proxy server may have information stored (e.g. as part of a database) to associate the client device with the first object storage. Accordingly, the proxy server may only need to identify the client device to determine the destination object storage, and thus, the appropriate set of functions from the function library.

In 303, the system may partition the first file into one or more chunks. The system may partition the first file into chunks of a predefined size. In some embodiments, the predefined size may be based on the particular object storage. For example, the predefined size may be specific to the first object storage.

In 304, the system may deduplicate the chunks of the first file by determining which of the chunks are already stored on the first object storage. In some embodiments, determining which of the chunks are already stored on the first object storage may include accessing an index maintained by the proxy server and without accessing the client device. For example, in some embodiments, the deduplicating is performed by the system (e.g. proxy server) without obtaining additional information from the client device after receiving the request to back up the first file to the first object storage. For example, the only substantive information required to perform the backup process is contained within the initial request provided by the client device. In some embodiments, the substantive information included within the request may include only an identifier for the first file. In some embodiments, the only substantive information included within the request may include an identifier for the first file and an identifier for the first object storage.

In 305, the system may transfer the deduplicated chunks of the first file to the first object storage. In some embodiments, the system may transfer the deduplicated chunks, using the first set of functions. For example, the system may determine the particular destination object storage, and in response, identify (or select) the first set of functions as the appropriate set of functions for the destination object storage. In some embodiments, characteristics of the transfer may be determined based on the destination object storage. For example, the characteristics may be specific to the first object storage. In some embodiments, the characteristics may include a number of available concurrent access connections. For example, the system may create, using the first set of functions, a set of concurrent connections with the first object storage. Accordingly, the deduplicated chunks of the first file may be transferred in parallel (e.g. substantially at the same time) to the first object storage via the set of concurrent access connections.

The system may also perform a validation of the transferred data. More particularly, in some embodiments, the system may create a first set of hash values for the chunks of the first file prior to transferring the deduplicated chunks of the first file to the first object storage. Accordingly, the system may validate, using the first set of functions, the transferred chunks of the first file by determining whether a second set of hash values created for the transferred chunks stored on the first object storage match the first set of hash values.

In some embodiments, the system may handle requests from a different client devices to different object storages using the same proxy server. More specifically, in some embodiments, the system may receive, at the proxy server and from the client device accessing the first API, a second file as part of a request to back up the second file to a second object storage (e.g. object storage B 150B). The system may identify a second set of functions, amongst the library of functions stored by the proxy server, specific to the second object storage and configured to access a third API (e.g. storage API B 155B) provided by the second object storage. The system may also partition the second file into one or more chunks of the predefined size, and deduplicate the chunks of the second file by determining which of the chunks are already stored on the second object storage. Accordingly, the system may transfer, using the second set of functions, the deduplicated chunks of the second file to the second object storage.

In some embodiments, the proxy server may be provided by a backup service provider (e.g. Dell EMC) associated with multiple client accounts, and the first object storage may be provided by a first third-party cloud-based storage provider (e.g. Amazon S3), and the second object storage may be provided by a second third-party cloud-based storage provider (e.g. Microsoft Azure).

Figure 4:
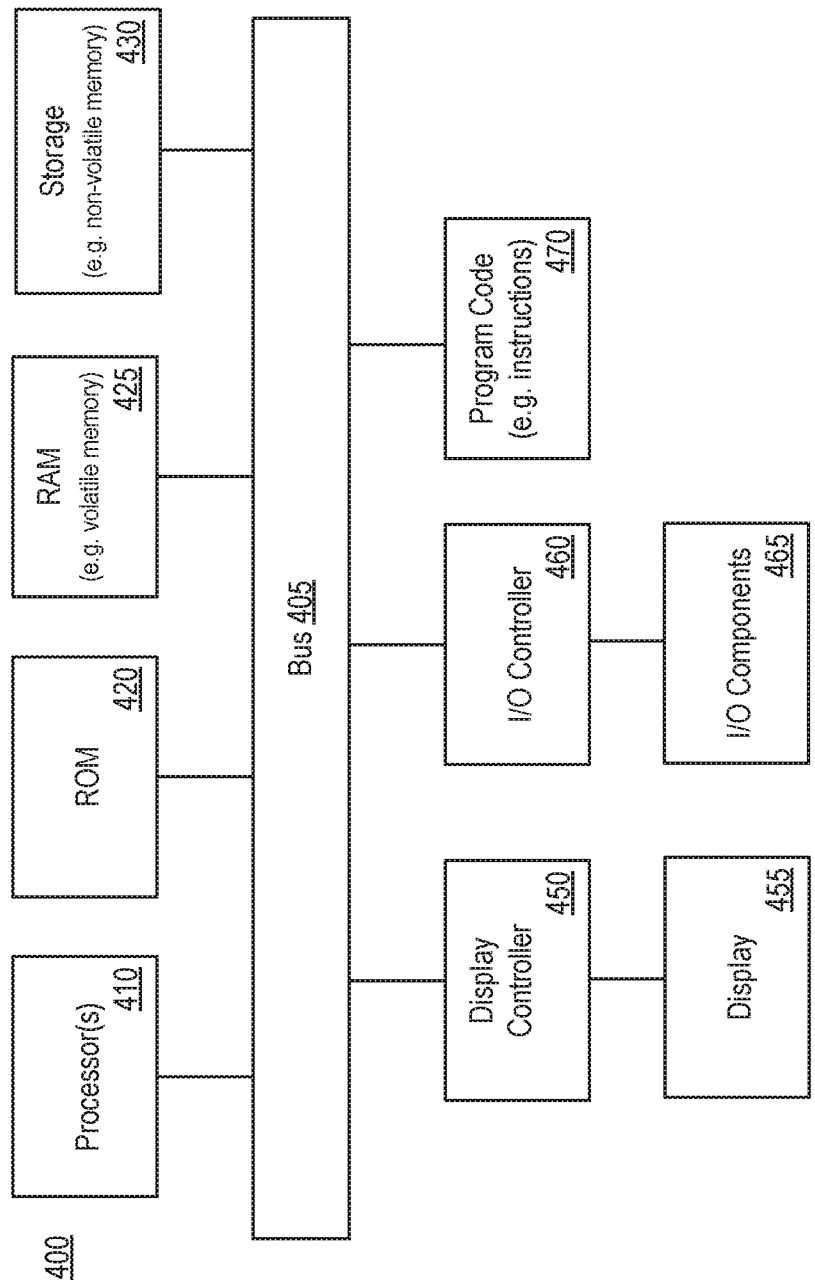
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. proxy server 120, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. proxy server 120, backup processing components 221-225, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:
1. A system comprising:
one or more processors; and a non-transitory computer readable medium storing a plurality of instructions, which when executed, cause the one or more processors to:

receive, at a proxy server and from a client device accessing a first application programming interface (API) provided by the proxy server, a first file and identification of a first object storage as part of a client request to back up the first file to the first object storage, the first API including a set of agnostic functions to perform data-related operations on a plurality of object storages;

determine, by the proxy server, a first set of functions for performing the backup of the first file on the first object storage from a library of functions accessible by the proxy server based on the identification of the first object storage in the client request, the library of functions being a collection of the first set of functions and a second set of functions used for backup operations for a plurality of object storages, comprising the first object storage provided by a first third-party cloud-based storage provider and a second object storage provided by a second third-party cloud-based storage provider, stored in a common location, each function in the first set of functions being a specific operation associated with the first object storage and configured to access a second API provided by the first object storage, each function in the second set of functions being a specific operation associated with the second object storage and configured to access a third API provided by the second object storage;

initiate a backup processing of the first file by the proxy server in response to determining the first set of functions from the library by partitioning the first file into one or more chunks;

deduplicate the chunks of the first file by determining which of the chunks are already stored on the first object storage by accessing an index maintained by the proxy server and without accessing the client device as part of the back up processing of the first file performed by the proxy server, in response to partitioning the first file into one or more chunks;

transfer, by the proxy server using the first set of functions, the deduplicated chunks of the first file to the first object storage as part of the back up processing of the first file performed by the proxy server; and validate, by the proxy server, the transferred chunks of the first file using a validation operation to compare the deduplicated chunks of the first file before and after the transmission, the validation operation being included in the first set of functions retrieved from the library of functions.

2. The system of claim 1, wherein the plurality of instructions, when executed, further cause the one or more processors to:

create, by the proxy server using the first set of functions, a set of concurrent connections with the first object storage, wherein the deduplicated chunks of the first file are transferred in parallel to the first object storage via the set of concurrent connections.

3. The system of claim 1, wherein the plurality of instructions, when executed, further cause the one or more processors to:

create, by the proxy server, a first set of hash values for the chunks of the first file prior to transferring the deduplicated chunks of the first file to the first object storage; and wherein the validation of the transferred chunks includes using the validation operation to determine whether a second set of hash values created for the transferred chunks stored on the first object storage match the first set of hash values.

4. The system of claim 1, wherein the deduplicating is performed by the proxy server without obtaining additional information from the client device after receiving the request to back up the first file to the first object storage.

5. The system of claim 1, wherein the plurality of instructions, when executed, further cause the one or more processors to:
receive, at the proxy server and from the client device accessing the first API, a second file as part of a request to back up the second file to the second object storage;
identify the second set of functions, amongst the library of functions stored by the proxy server, specific to the second object storage and configured to access the third API provided by the second object storage;
partition, by the proxy server, the second file into one or more chunks;
deduplicate, by the proxy server, the chunks of the second file by determining which of the chunks are already stored on the second object storage; and
transfer, by the proxy server using the second set of functions, the deduplicated chunks of the second file to the second object storage.

6. The system of claim 5, wherein the proxy server is provided by a backup service provider associated with multiple client accounts, and the first object storage is provided by the first third-party cloud-based storage provider, and the second object storage is provided by the second third-party cloud-based storage provider.

7. The system of claim 1, wherein a network configuration associated with the client device prevents access to the client device directly from the first object storage, and the request to back up the first file from the client device is provided using a privileged connection specified by the network configuration.

8. The system of claim 1, wherein the request to back up the first file includes an identifier for the first file and an identifier for the first object storage.

9. A method comprising:
receiving, at a proxy server and from a client device accessing a first application programming interface (API) provided by the proxy server, a first file and identification of a first object storage as part of a client request to back up the first file to the first object storage, the first API including a set of agnostic functions to perform data-related operations on a plurality of object storages;
determining, by the proxy server, a first set of functions for performing the backup of the first file on the first object storage from a library of functions accessible by the proxy server based on the identification of the first object storage in the client request, the library of functions being a collection of the first set of functions and a second set of functions used for backup operations for a plurality of object storages, comprising the first object storage provided by a first third-party cloud-based storage provider and a second object storage provided by a second third-party cloud-based storage provider, stored in a common location, each function in the first set of functions being a specific operation associated with the first object storage and configured to access a second API provided by the first object storage, each function in the second set of functions being a specific operation associated with the second object storage and configured to access a third API provided by the second object storage;
initiating a backup processing of the first file by the proxy server in response to determining the first set of functions from the library by partitioning the first file into one or more chunks;
deduplicating the chunks of the first file by determining which of the chunks are already stored on the first object storage by accessing an index maintained by the proxy server and without accessing the client device as part of the back up processing of the first file performed by the proxy server, in response to partitioning the first file into one or more chunks;
transferring, by the proxy server using the first set of functions, the deduplicated chunks of the first file to the first object storage as part of the back up processing of the first file performed by the proxy server; and
validating, by the proxy server, the transferred chunks of the first file using a validation operation to compare the deduplicated chunks of the first file before and after the transmission, the validation operation being included in the first set of functions retrieved from the library of functions.

10. The method of claim 9, further comprising:
creating, by the proxy server using the first set of functions, a set of concurrent connections with the first object storage, wherein the deduplicated chunks of the first file are transferred in parallel to the first object storage via the set of concurrent connections.

11. The method of claim 9, further comprising:
creating, by the proxy server, a first set of hash values for the chunks of the first file prior to transferring the deduplicated chunks of the first file to the first object storage; and
wherein the validation of the transferred chunks includes using the validation operation to determine whether a second set of hash values created for the transferred chunks stored on the first object storage match the first set of hash values.

12. The method of claim 9, wherein the deduplicating is performed by the proxy server without obtaining additional information from the client device after receiving the request to back up the first file to the first object storage.

13. The method of claim 9, further comprising:
receiving, at the proxy server and from the client device accessing the first API, a second file as part of a request to back up the second file to the second object storage;
identifying the second set of functions, amongst the library of functions stored by the proxy server, specific to the second object storage and configured to access the third API provided by the second object storage;
partitioning, by the proxy server, the second file into one or more chunks;
deduplicating, by the proxy server, the chunks of the second file by determining which of the chunks are already stored on the second object storage; and
transferring, by the proxy server using the second set of functions, the deduplicated chunks of the second file to the second object storage.

14. The method of claim 13, wherein the proxy server is provided by a backup service provider associated with multiple client accounts, and the first object storage is provided by the first third-party cloud-based storage provider, and the second object storage is provided by the second third-party cloud-based storage provider.

15. A computer program product comprising a non-transitory computer-readable medium having a computer-readable program code embodied therein to be executed by one or more processors, the program code including instructions to:

receive, at a proxy server and from a client device accessing a first application programming interface (API) provided by the proxy server, a first file and identification of a first object storage as part of a client request to back up the first file to the first object storage, the first API including a set of agnostic functions to perform data-related operations on a plurality of object storages;

determine, by the proxy server, a first set of functions for performing the backup of the first file on the first object storage from a library of functions accessible by the proxy server based on the identification of the first object storage in the client request, the library of functions being a collection of the first set of functions and a second set of functions used for backup operations for a plurality of object storages, comprising the first object storage provided by a first third-party cloud-based storage provider and a second object storage provided by a second third-party cloud-based storage provider, stored in a common location, each function in the first set of functions being a specific operation associated with the first object storage and configured to access a second API provided by the first object storage, each function in the second set of functions being a specific operation associated with the second object storage and configured to access a third API provided by the second object storage;

initiate a backup processing of the first file by the proxy server in response to determining the first set of functions from the library by partitioning the first file into one or more chunks;

deduplicate the chunks of the first file by determining which of the chunks are already stored on the first object storage by accessing an index maintained by the proxy server and without accessing the client device as part of the back up processing of the first file performed by the proxy server, in response to partitioning the first file into one or more chunks;

transfer, by the proxy server using the first set of functions, the deduplicated chunks of the first file to the first object storage as part of the back up processing of the first file performed by the proxy server; and validate, by the proxy server, the transferred chunks of the first file using a validation operation to compare the deduplicated chunks of the first file before and after the transmission, the validation operation being included in the first set of functions retrieved from the library of functions.

16. The computer program product of claim 15, wherein the program code includes further instructions to:
create, by the proxy server using the first set of functions, a set of concurrent connections with the first object storage, wherein the deduplicated chunks of the first file are transferred in parallel to the first object storage via the set of concurrent connections.

17. The computer program product of claim 15, wherein the program code includes further instructions to:
create, by the proxy server, a first set of hash values for the chunks of the first file prior to transferring the deduplicated chunks of the first file to the first object storage; and
wherein the validation of the transferred chunks includes using the validation operation to determine whether a second set of hash values created for the transferred chunks stored on the first object storage match the first set of hash values.

18. The computer program product of claim 15, wherein the deduplicating is performed by the proxy server without obtaining additional information from the client device after receiving the request to back up the first file to the first object storage.

19. The computer program product of claim 15, wherein the program code includes further instructions to:
receive, at the proxy server and from the client device accessing the first API, a second file as part of a request to back up the second file to the second object storage;
identify the second set of functions, amongst the library of functions stored by the proxy server, specific to the second object storage and configured to access the third API provided by the second object storage;
partition, by the proxy server, the second file into one or more chunks;
deduplicate, by the proxy server, the chunks of the second file by determining which of the chunks are already stored on the second object storage; and
transfer, by the proxy server using the second set of functions, the deduplicated chunks of the second file to the second object storage.

20. The computer program product of claim 19, wherein the proxy server is provided by a backup service provider associated with multiple client accounts, and the first object storage is provided by the first third-party cloud-based storage provider, and the second object storage is provided by the second third-party cloud-based storage provider.

* * * * *